(No Model.)

G. H. F. SCHRADER.
VALVE.

No. 505,486. Patented Sept. 26, 1893.

WITNESSES:
John Becker
Fred White

INVENTOR:
George H. F. Schrader,
By his Attorneys,
Arthur C. Fraser & Co.

UNITED STATES PATENT OFFICE.

GEORGE H. F. SCHRADER, OF NEW YORK, N. Y.

VALVE.

SPECIFICATION forming part of Letters Patent No. 505,486, dated September 26, 1893.

Application filed February 9, 1893. Serial No. 461,251. (No model.)

*To all whom it may concern:*

Be it known that I, GEORGE H. F. SCHRADER, a citizen of the United States, residing in the city, county, and State of New York, have invented certain new and useful Improvements in Valves, of which the following is a specification.

This invention relates to valves, particularly to air valves for pneumatic bicycle tires, and is designed to provide certain improvements in such valves which will be fully hereafter set forth.

Figure 1:
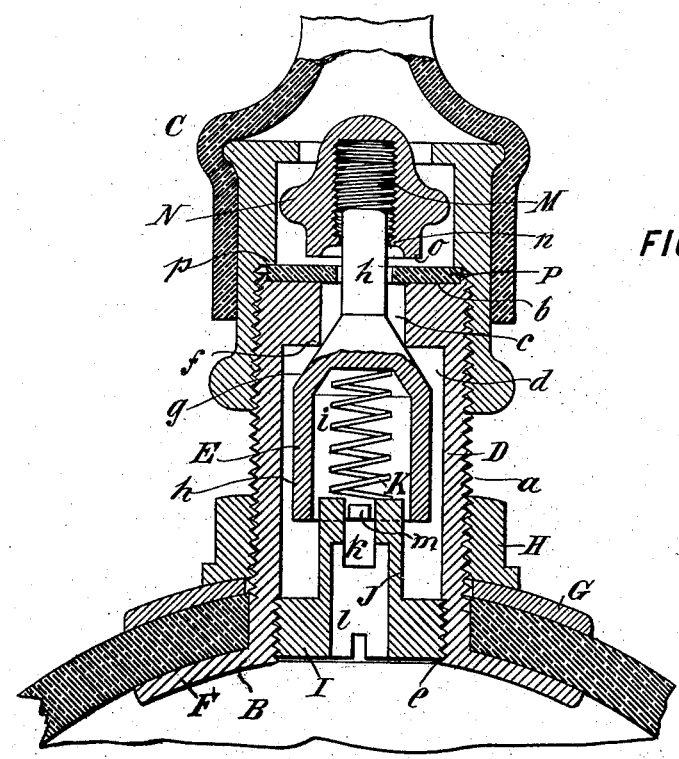
Figure 2:
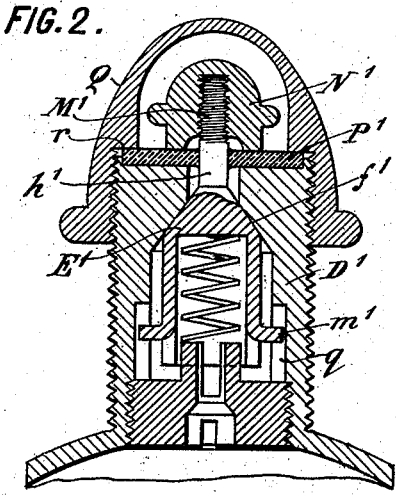
Figure 3:
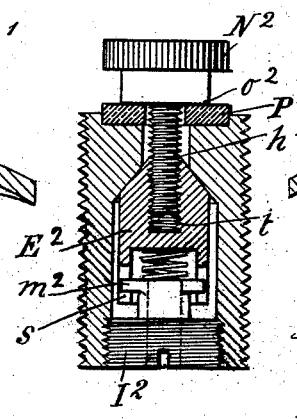
Figure 4:
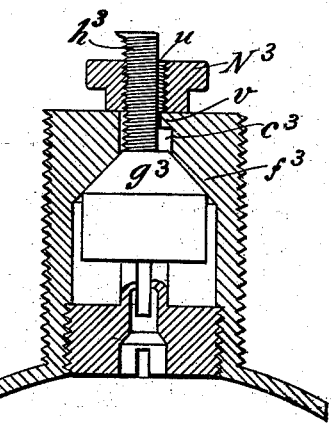

In the accompanying drawings, Figure 1 is an axial section of the preferred form of my improved valve, a fragment of the tire being shown in section and the coupling of an air pump pipe shown attached to the valve. Fig. 2 is a section of a slightly modified construction of valve to which the usual cap is applied. Fig. 3 is a similar section of another modified construction of valve and Fig. 4 shows another modification.

Referring to the drawings let A represent the valve as a whole, B a bicycle tire or other vessel to which the valve is applied, and C a pump coupling for feeding the valve.

Referring to Fig. 1 the valve A consists of a tubular casing D and a plunger E within said casing for controlling communication through the valve, the one being movable relatively to the other.

The casing D is preferably constructed with a flange F at its lower end projecting laterally within the tire B and suitably clamped against the inner face thereof, and from this flange the outer wall of the casing rises in the form of a screw-threaded surface $a$, terminating at top in a socketed face $b$. From this face $b$ an aperture $c$ extends inwardly and communicates with an enlarged cylindrical space $d$ within the socket, which continues through to the lower end of the socket and at its lower end is constructed with an internal screw thread $e$. A washer G fits over the screw thread $a$ of the casing and lies against the top face of the tire B, and a nut H screws on the screw thread $a$ and when screwed home clamps the tire between the washer G and the flange F, thus securely fastening the casing of the valve to the tire. Internally the casing is preferably constructed with a shoulder between its aperture $c$ and space $d$, which shoulder leaves a square corner $f$ at its junction with the aperture, which corner constitutes the valve seat of the casing.

The plunger E has a conical seating face $g$ within the casing and acting against the seat $f$ of the latter for closing the valve. Above this face $g$ it is provided with a smooth cylindrical stem $h$ rising through the aperture $c$ and projecting beyond the outer face of the casing to permit manipulation of the plunger. Below the face $g$ the plunger is constructed with an enlarged cylindrical portion nearly filling the space $d$ of the casing and extending some distance downwardly therein. This portion $h$ is constructed with a hollow interior $i$, open at its lower end.

A plug I is screwed into the lower end of the casing engaging the screw thread $e$ thereof. This plug has a reduced cylindrical upward projection J loosely fitting the hollow $i$ in the plunger E for guiding the latter. A cross groove $k$ is formed in this guiding projection J, and an axial hole $l$ is tapped in the plug I to communicate with this groove. Thus through the hole and groove there is communication between the interior of the tire and the interior of the casing D. A spring K within the hollow $i$ acts at its lower end against the plug I and at its upper end against the plunger to force the latter to the closed position. A lug $m$ is struck inwardly from the lower edge of the wall of the end $h$ of the plunger, which lug enters the groove $k$ in the plug I to prevent relative rotation of the parts. In this construction the outer end of the stem $h$ of the plunger is provided with an enlarged exteriorly screw threaded head M, onto which screws a handle nut N. This nut has a lip $n$ which is turned inwardly around the stem $h$ to overhang the head M thereof and thereby prevent separation of the nut and plunger. Below this lip the nut N has a seating face $o$. A washer P of packing material is seated in the socket $b$, loosely surrounding the stem $h$ and extending close to the screw threaded outer wall of the casing.

In operation the plunger and casing are locked against rotation by the lug $m$ which engages the groove $k$ in the plug I. The conduit through the valve extends through the hollow plug I and its groove $k$ into and through the space $d$ within the casing around the part $h$ of the plunger, between the face $g$ of the latter and the seat $f$ of the casing into the aperture $c$ thereof, around the stem $h$ between the latter and the packing washer P and under the seating face $o$ of the nut N. When the valve is in closed position the nut N is screwed down tightly against the washer P, thus making an air tight joint between the face $b$ of the casing and the nut, and simultaneously drawing the seating face $g$ into intimate contact with the seat $f$. When thus screwed down the nut N distorts the inner portion of the washer tightly against the smooth cylindrical wall of the shank $h$, thus also making a closure at this point. When the valve is open the nut N is screwed away from the washer and the plunger and nut can oscillate together under the action of the inflowing air and the closing action of the spring K. When the pump coupling C is applied it is screwed onto the screw thread $a$ of the casing B until its internal shoulder $p$ tightly engages the packing washer P carried on the end thereof. Thus an air tight joint is made between the coupling and valve. The nut N is of such size that it passes freely within the coupling C so that the latter can be applied without removing the nut and there will be sufficient space for the passage of air within the coupling around the nut. After the nut has been screwed to the open position the coupling C will be applied and the inflowing air from the pump will shift the plunger sufficiently to permit the passage of the air into the casing. When the inflow ceases the spring K in conjunction with the pressure within the casing will seat the plunger against the seat $f$, whereupon the coupling C can be removed and the valve made permanently tight by screwing the hand nut N home. The hand nut N is preferably an imperforate metal cap, whereby there is no opportunity for leakage through its screw thread connection with the stem. Thus the only leakage joint for the valve is at the seating face $o$ of the nut, which can be readily made air tight by the use of a packing washer P or by grinding the faces of the nut and casing. It is preferable to use the washer, and to grind the face $g$ of the plunger and the seat $f$ of the casing for additional security.

It will be seen that my invention provides an extremely simple and effective air valve which can be successfully constructed of very small sizes, as required for bicycle valves; it will also be seen that the invention dispenses with the necessity of using a soft packing material within the valve, and of using the usual cap for enveloping the working parts.

It will be understood that the invention is not limited to the precise details of construction and arrangement shown in Fig. 1, as these may be variously modified as circumstances or the judgment of those skilled in the art may dictate, without departing from the essential features of the invention. One such modification is shown in Fig. 2, which illustrates a valve in its general respects similar to Fig. 1, but differing therefrom in that the casing here lettered D' is constructed with a tapering seat lettered $f'$ and with internal guide grooves lettered $q$, the plunger being constructed with outwardly turned lugs lettered $m'$ engaging these grooves $q$ for preventing relative rotation of parts. At its outer end the plunger has a shank lettered $h'$ smooth at its lower part and screw threaded at M', onto which screw threaded end the hand nut lettered N' is screwed, the nut and shank being detachably connected together in this instance. The usual cap Q is here shown screwed on to the end of the casing and having a shoulder $r$ engaging the outer edge of the packing washer here lettered D' for making a tight joint. The operation of this construction is the same as described with reference to Fig. 1.

Fig. 3 shows a modification of the plunger and hand nut. In this construction the plunger here lettered $E^2$ has grooves $s$ at its lower end, and the plug lettered $I^2$ has lateral lugs $m^2$ engaging these grooves to prevent rotation of the plunger. A screw threaded hole $t$ is provided in the upper end of the plunger and the hand nut here lettered $N^2$ has a screw threaded shank lettered $h^2$ entering this hole and engaging the screw threads thereof. The face $o^2$ of the nut bears on the washer here lettered $P^2$. In operation rotation of the hand nut screws its shank into or out of the plunger and thereby opens or closes the valve.

Fig. 4 shows a modification of the hand nut and plunger. The stem here lettered $h^3$ is screw threaded and constructed with a flat side $u$ formed by filing off one of its sides, and the aperture lettered $c^3$ has a shoulder or inward projection $d$ corresponding to the side $u$ and preventing rotation of the shank relatively to the casing. The nut here lettered $N^3$ is an ordinary nut through which the stem passes. The upper end of the stem is swaged over to prevent removal of the nut. In this construction the seating face $g^3$ of the stem and the seat $f^3$ of the casing are ground to make an air tight fit and are relied on for the closure of the valve. In operation these faces are brought into intimate contact by rotation of the nut $N^3$.

What I claim is, in a valve, the following-defined features and combinations, substantially as hereinbefore set forth, namely:

1. In a bicycle tire valve, the casing D, having an internal seating face, and an outlet aperture $c$, in combination with a plunger E therein having a seating face within said casing engaging the internal seating face thereof, a contracted stem above its seating face, projecting outside of said casing, and having a screwthreaded outer end, and a nut exteriorly of said casing engaging and irremovably fastened to said screwthreaded end of said stem for operating the plunger, whereby the separation of the stem and nut is prevented.

2. In an air valve, the casing D, having hollow interior $d$, aperture $c$, and internal seating face $f$, in combination with the plunger E within said casing, having a seating face $g$ within said casing engaging said seating face $f$, said plunger having a reduced stem extending outside of the casing and an enlarged screwthreaded outer end $m$ exteriorly of said casing, and a nut having an internal screwthread engaging that of said stem for operating it, and having an inward projection $n$ opposite said reduced stem and projection in the path of the screwthread $m$ thereof, whereby separation of the nut and stem is prevented.

3. In a bicycle valve, the casing D, having hollow interior $d$ and screwthread $e$ at the lower end thereof, in combination with a slotted plug I entering the end of said casing and engaging the screwthread $e$ thereof, and a plunger E movably mounted within said casing, and having a lug $m$ engaging the slot of said plug and preventing rotation of said plunger, substantially as and for the purpose set forth.

4. In a valve the casing D in combination with the plug I fitting the hollow interior thereof and having guiding projection J, the plunger E within said casing having enlarged end $h$ and hollow portion $i$ fitting over said projection J and guided thereby, and a spring K for said plunger within the hollow portion thereof and acting against said projection J.

In witness whereof I have hereunto signed my name in the presence of two subscribing witnesses.

GEORGE H. F. SCHRADER.

Witnesses:
GEORGE H. FRASER,
THOMAS F. WALLACE.